(12) United States Patent
Kindratenko et al.

(10) Patent No.: US 6,744,434 B2
(45) Date of Patent: Jun. 1, 2004

(54) CUTS REMOVAL SYSTEM FOR TRIANGULATED CAD MODELS

(75) Inventors: Volodymyr V. Kindratenko, Savoy, IL (US); Robert J. Fenwick, Champaign, IL (US)

(73) Assignee: Caterpillar Inc, Peoria, IL (US)

( * ) Notice: Subject to any disclaimer, the term of this patent is extended or adjusted under 35 U.S.C. 154(b) by 346 days.

(21) Appl. No.: 09/997,031

(22) Filed: Nov. 30, 2001

(65) Prior Publication Data
US 2003/0103049 A1 Jun. 5, 2003

(51) Int. Cl.[7] ................................. G06T 15/30
(52) U.S. Cl. ................... 345/423; 345/428; 700/98
(58) Field of Search .................. 345/423, 428; 700/98

(56) References Cited

U.S. PATENT DOCUMENTS

| | | |
|---|---|---|
| 4,594,673 A | 6/1986 | Holly |
| 4,887,228 A | 12/1989 | Robert |
| 5,299,302 A | 3/1994 | Fiasconaro |
| 5,420,970 A | 5/1995 | Steiner et al. |
| 5,467,409 A | 11/1995 | Yamamoto |
| 5,574,835 A | 11/1996 | Duluk, Jr. et al. |
| 5,590,248 A | * 12/1996 | Zarge et al. ............... 345/421 |
| 5,600,763 A | 2/1997 | Greene et al. |
| 5,689,577 A | 11/1997 | Arata |
| 5,751,291 A | 5/1998 | Olsen et al. |
| 5,870,100 A | 2/1999 | DeFreitas |
| 5,914,721 A | 6/1999 | Lim |
| 5,949,423 A | 9/1999 | Olsen |
| 5,974,169 A | 10/1999 | Bachelder |
| 6,016,153 A | 1/2000 | Gueziec et al. |
| 6,046,744 A | 4/2000 | Hoppe |
| 6,088,035 A | 7/2000 | Sudarsky et al. |
| 6,094,200 A | 7/2000 | Olsen et al. |
| 6,130,670 A | 10/2000 | Porter |
| 6,130,673 A | 10/2000 | Pulli et al. |
| 6,137,497 A | 10/2000 | Strunk et al. |
| 6,172,679 B1 | 1/2001 | Lim |
| 6,184,897 B1 | 2/2001 | Gueziec et al. |

* cited by examiner

*Primary Examiner*—Mark Zimmerman
*Assistant Examiner*—Michael V Whelpley
(74) *Attorney, Agent, or Firm*—Finnegan, Henderson, Farabow, Garrett & Dunner

(57) ABSTRACT

A method for reducing the complexity of a triangulated CAD model while preserving the topological properties and shape of the original model is disclosed. In operation, the system and method identifies a plurality of coplanar vertices in a CAD model, removes the coplanar vertices if they form a circle that is smaller than a predetermined size, and then re-triangulates an opening left by the removal of the vertices from the CAD model.

17 Claims, 11 Drawing Sheets

CUTS REMOVAL SYSTEM FOR TRIANGULATED CAD MODELS

TECHNICAL FIELD

The present invention relates to computer graphics, and more particularly, to a method and apparatus reducing the complexity of objects in a 3-D virtual environment.

BACKGROUND

Interactive computer graphics systems produce realistic-looking, three-dimensional models and are useful for applications such as architectural and mechanical computer aided design (CAD), flight simulation, and virtual reality. Such graphics systems typically include a computer workstation that displays images of a three-dimensional model on a video screen as seen from a simulated observer's viewpoint that can be interactively controlled by the user. Ever since the introduction of computer graphics, there has been an ongoing demand to produce more realistic and interactive images. The term, "real-time," is commonly used to describe interactive and realistic image processing systems. In a "real-time" system, the user should perceive a continuous motion of objects in a scene. For example, in a video game having real-time capabilities, the active characters and view point should respond with minimal delay to a user's inputs, and should move smoothly. To produce such real-time effects, an image rendering system has to generate a new image at a sufficiently high rate such that the user perceives continuous motion of objects in a scene. The rate at which a new image is computed for display is referred to as the "computational" rate or the "computational frame" rate. The computational rate needed to achieve realistic effects can vary depending on how quickly objects move about the scene and how rapidly the viewing perspective changes. For a typical application, a real-time graphics system recomputes a new image at least ten times a second to generate a series of images that simulate continuous motion. For high-quality animation applications, however, the computational rate may be significantly higher. It is generally desired that such graphics systems maintain an interactive frame rate that is substantially constant (e.g., twelve frames per second).

One problem associated with typical graphics processing devices is the memory required to store the bitmap for even a single image. For example, the system may require 3.75 megabytes (Mb) of random access memory to support a display resolution of 1280×1024 (i.e., number of pixel columns and rows) and 24 bits of color information per pixel. This information, which again represents the image of a single screen, is stored in a portion of the computer's display memory known as a frame buffer.

The demands placed upon the system are further exacerbated by the complexity of the information that often must be processed to render an image from the object stored. For example, the modeling of a three-dimensional surface is, in itself, a complex task. While a curved surface can be represented by a mesh of planar polygons, the "smoothness" of its appearance in the rendered image will depend both upon the resolution of the display and the number of individual polygons that are used to model the surface. Consequently, the computations associated with high resolution modeling of complex surfaces based upon polygon meshes can be extremely resource intensive.

In conventional graphics systems, an object or scene is scanned and an image of it is otherwise digitized and stored in the system as a set of data points relating to position, texture, and color. The scanned image is tessellated into sets of object elements such as polygons (typically triangles), which in the aggregate approximate the shape of the original object or scene (generally, the geometry) to the degree of resolution of the imaging and storage properties of the system. Although modem modeling systems used in CAD virtual reality and other forms of modem animation are expanding their geometric domain to include free form surfaces, polygonal models remain the primary 3D representation used in the manufacturing, architectural, mechanical, and entertainment industries. Polygonal models are particularly effective for hardware assisted rendering, which is important for mechanical, architectural, virtual reality, and electronic mock-up applications involving complex CAD models.

These complex three-dimensional models routinely consist of hundreds or thousands of polygons. Even a relatively simple CAD model of an oil tank consisting of less than 25 parts can contain nearly 20,000 separate polygons. As the simulated observer's interactive viewpoint changes (e.g., rotating the oil tank and zooming in on certain portions of the tank), objects can enter or leave the simulated field of view, or can be occluded from view by other objects. As introduced above, conventional graphics systems typically include a frame buffer. To generate an image, the graphic system renders all of the objects in a scene and stores the resulting image in this frame buffer. The system then transfers the rendered image data to a display. In a conventional graphics architecture, the entire frame buffer is erased and the scene is re-rendered to create a next frame's image. In this type of system, every object must be redrawn for each frame because the frame buffer is cleared between frames. Every object therefore is updated at the same rate, regardless of its actual motion in the scene or its importance to the particular application. This can often lead to a perceptible "popping" display effect. For this reason, it is desirable to provide the capability of rendering the model such that a sufficiently detailed image can be displayed to an observer and a smooth visual transition occurs between two representations of the same image.

U.S. Pat. No. 5,590,248 to Zarge et al. discloses a method for reducing the complexity of a polygonal mesh representative of the surface of an object to be displayed. The patent discloses a process of removing co-planar vertices and polygons from a polygonal mesh, but does not disclose the capability to identify and remove round cuts of a predetermined size from a CAD model. Zarge simply discloses the process of identifying co-planar vertices and polygons, removing them and then re-triangulating the opening left by the removal of the vertices and polygons.

In summary, prior art techniques do not adequately address the problem of satisfactorily rendering a solid CAD model. There is a need to overcome these and other problems of the prior art and to provide an efficient method for optimizing the display of CAD models. The present invention, as illustrated in the following description, is directed to solving one or more of the problems set forth above.

SUMMARY OF THE INVENTION

In accordance with the present invention, a method for reducing the complexity of a triangulated CAD model is disclosed. In operation, the method identifies a plurality of coplanar vertices in a CAD model, removes the coplanar vertices if they form a circle of a predetermined size, and then triangulates an opening left by the removal of the vertices from the CAD model.

In accordance with another aspect of the present invention, a machine-readable storage medium is provided having stored thereon machine executable instructions. The execution of the instructions is adapted to implement a method for reducing the complexity of a triangulated CAD model. The method includes identifying a plurality of co-planar vertices in the model, removing the plurality of vertices from the model provided that the plurality of vertices form a circle of a predetermined size, and triangulating an opening left by removing the plurality of vertices from the model.

In accordance with yet another aspect of the present invention, an apparatus for reducing the complexity of a triangulated CAD model is disclosed. The apparatus comprises a network device having a memory containing a program that includes several modules. A module is provided for identifying a plurality of co-planar vertices in a triangulated CAD model. A module is provided for removing a plurality of vertices from the triangulated CAD model, provided the plurality of vertices form a circle of a predetermined size. A module is also provided for triangulating an opening left by the removal of the plurality of vertices from the triangulated CAD model.

DETAILED DESCRIPTION

Figure 1:
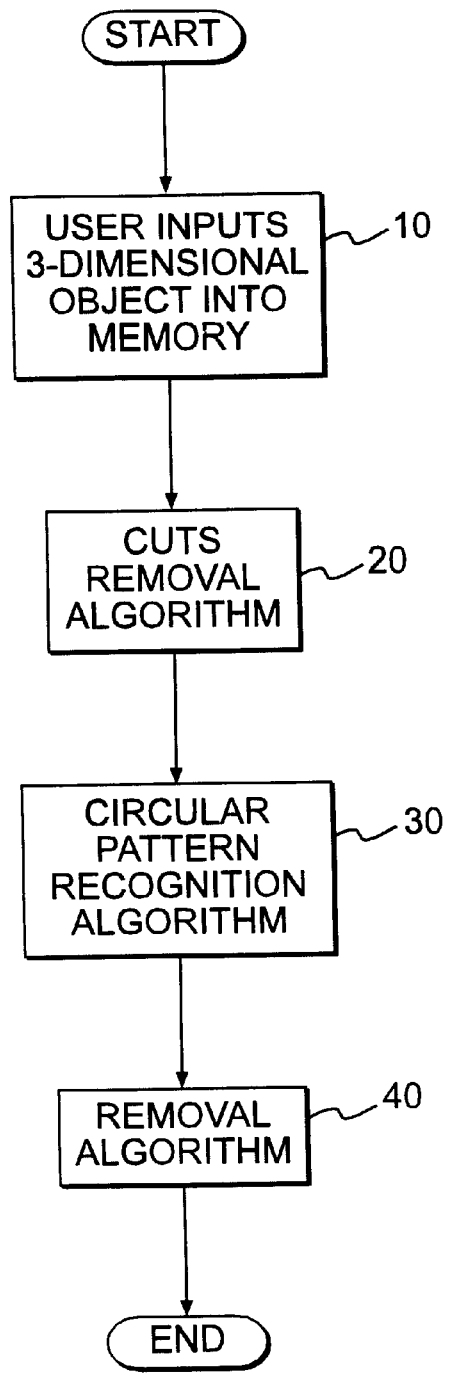
FIG. 1 depicts a flowchart showing the general operation of the present invention.

In the following detailed description, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that algorithmic changes may be made without departing from the scope of the present invention. The following detailed description is, therefore, not to be taken in a limited sense.

A method in accordance with the present invention, reduces the complexity of a triangulated CAD model, while preserving the topological properties and shape of the original model. In operation, the method collects at least one of the vertices from coplanar polygons and determines whether they form circular patterns. The method analyzes an identified circular pattern to determine whether it is smaller than a predetermined diameter, removes it, and re-triangulates the resulting hole.

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU, and the maintenance of these bits within data structures reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, work stations, or personal computers are connected via communication links of various types. In a client server arrangement, programs and data, many in the form of objects, are made available by various members of the system.

Referring now to the drawings, in which like numerals represent like elements throughout the several figures, the present invention will be described. FIG. 1 shows the general operation of the software routine 5 of the present invention. As shown in FIG. 1, the method of the present invention begins when a user inputs a three-dimensional object (step 10) into memory of a computer system. Next, in step 20, the system executes a cuts removal algorithm. Processing then flows to step 30 where the circular pattern recognition algorithm is executed. Once at least one of the qualifying circular patterns have been identified, processing flows to step 40 where the removal algorithm removes the circular patterns identified in step 30 from the triangulated CAD model.

Figure 2:
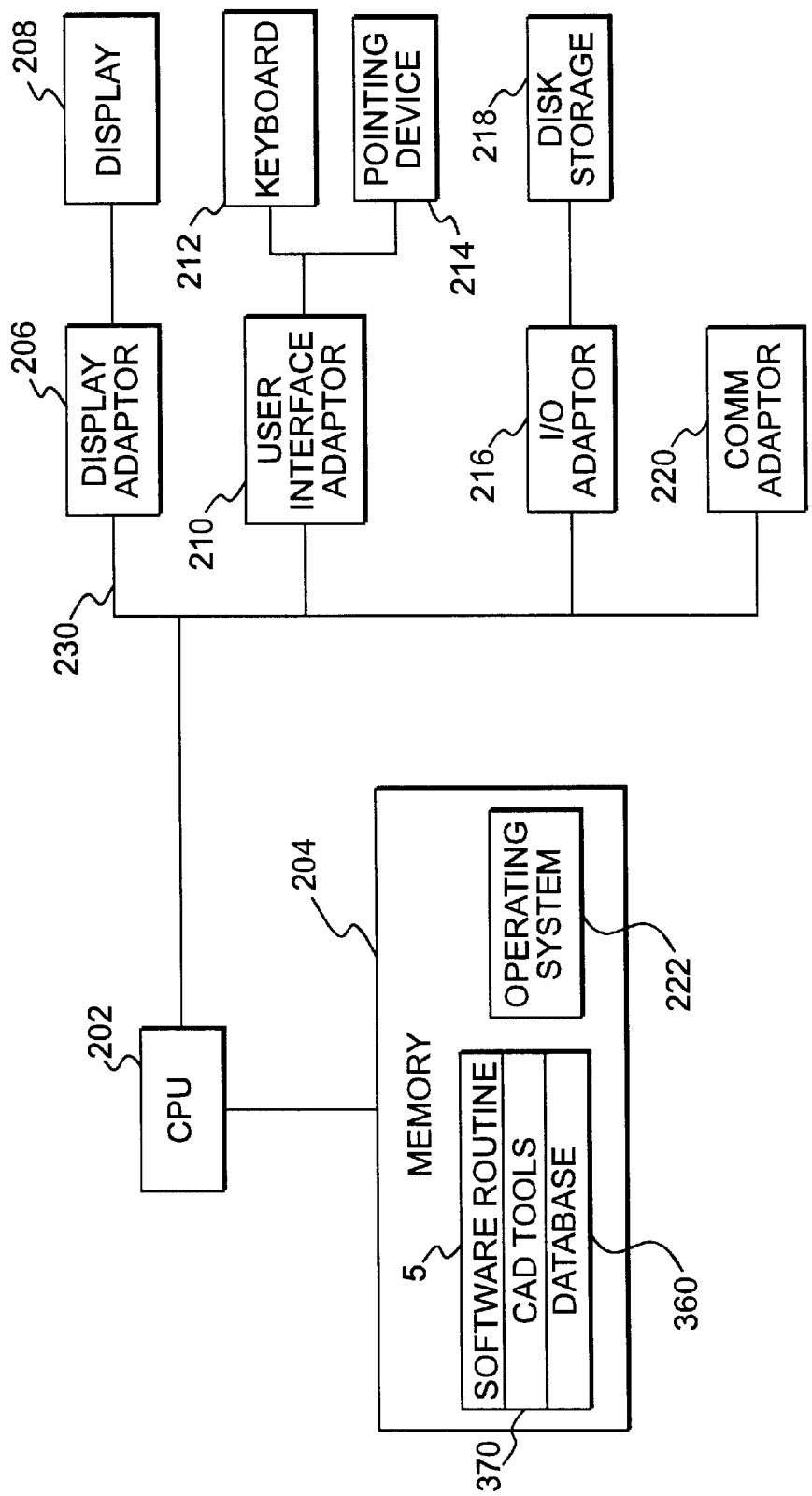
FIG. 2 is a block diagram of a computer for hosting an embodiment of the present invention.

FIG. 2 shows a detailed block diagram of a computer 200 that may be used to host and operate the present invention. Computer 200 as shown in FIG. 2 is comprised of a central processor unit (CPU) 202, a memory 204, a display adapter 206, a display 208, a user interface (UI) adapter 210, a pointing device 214, a keyboard 212, an input/output (IO) adapter 216, a disk storage unit 218, and a communications adapter 220 for providing a communications function. Memory 204 includes an operating system 222 for operating the device, the software routine 5 of the present invention, CAD tools 370 (FIG. 3), and a database 360 for storing a numerical representation of a plurality of three-dimensional objects. The various components of each computer 200 communicate through a system bus 230 or similar architecture. As shown in FIG. 2, display adaptor 206 is coupled to display 208, user interface adaptor 210 is coupled to pointing device 214 and keyboard 212, I/O adaptor 216 is coupled to disk storage unit 218 and communications adaptor 220 is coupled to a network interface cable for providing connectivity between computer 200 and a Public Switched Telephone Network (PSTN) interface for connectivity to an external computer network. In one embodiment, each computer 200 includes a personal computer. In another embodiment, computer 200 may be a high capacity information server. Computer 200 may have other components, as well, but these are not shown to facilitate description of the unique aspects of this embodiment of the invention. The hardware arrangement of this device, as well as other components discussed in this specification is intentionally shown as general, and is meant to represent a broad variety of architectures, which depend on the particular device used. In one embodiment, the software routine 5 of the present invention is implemented on a Silicon Graphics Incorporated (SGI) platform using Open Inventor™ (ver. 2) as the underlying graphics library.

Figure 3:
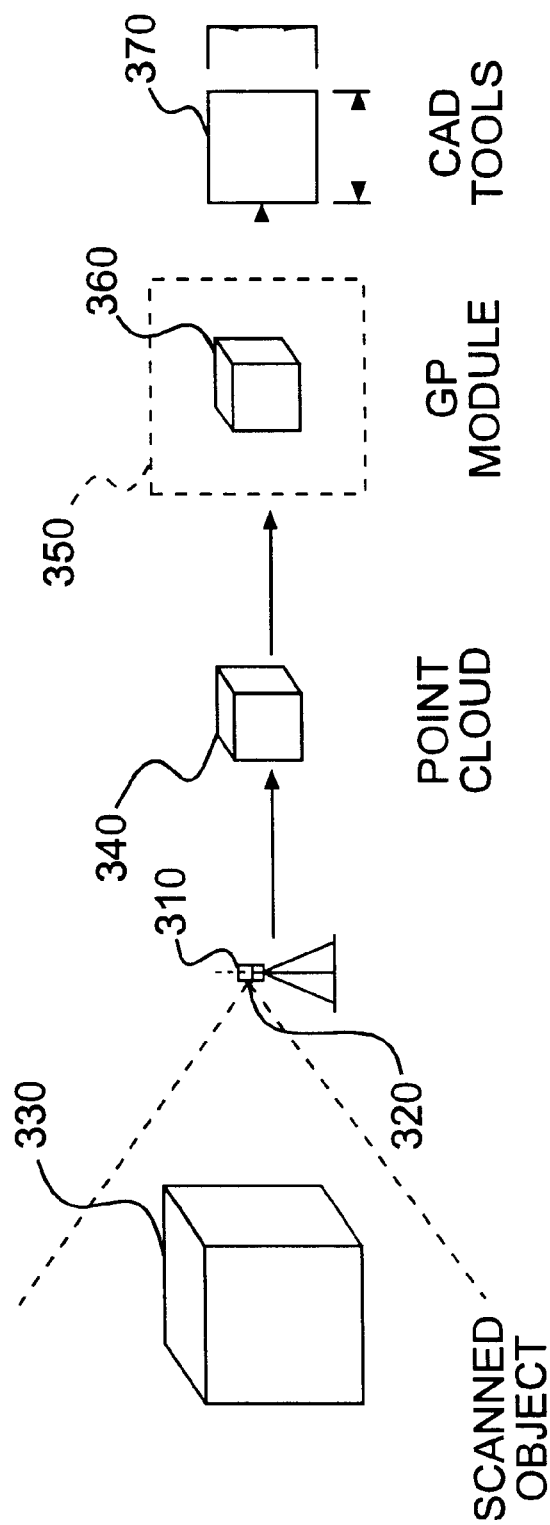
FIG. 3 is block diagram of a sub-system for inputting a three-dimensional object in accordance with the present invention.

FIG. 3 is a block diagram of one embodiment of a system for inputting a three-dimensional object in accordance with the present invention. As shown, the inputting subsystem 300 is comprised of an imaging device 310 and a graphics perception module 350. Referring to FIG. 3, it is shown that imaging device 310 includes a scanning sensor 320 for scanning an object 330 and for sensing the position in three-dimensional space of selected points on the surface of the object 330. Imaging device 310 generates a point cloud 340, which represents the sensed positions of the selected points. Point cloud 340 also represents other attributes of the sensed positions, such as reflectivity, surface color and texture. Graphics Perception (GP) module 350 interacts with imaging device 310 to provide control and targeting functions for scanning sensor 320. In addition, to using point cloud 340, GP module 350 recognizes geometric shapes represented by groups of points in point cloud 340, and it approximates the surface of object 330 into a static set of groups of polygons where each group represents a portion of object 330 model part in the CAD assembly sense. GP module 350 then converts computer-generated images into a database 360 usable by computer-aided design (CAD) tools 370 to render object 330 on a computer display.

Figure 4:
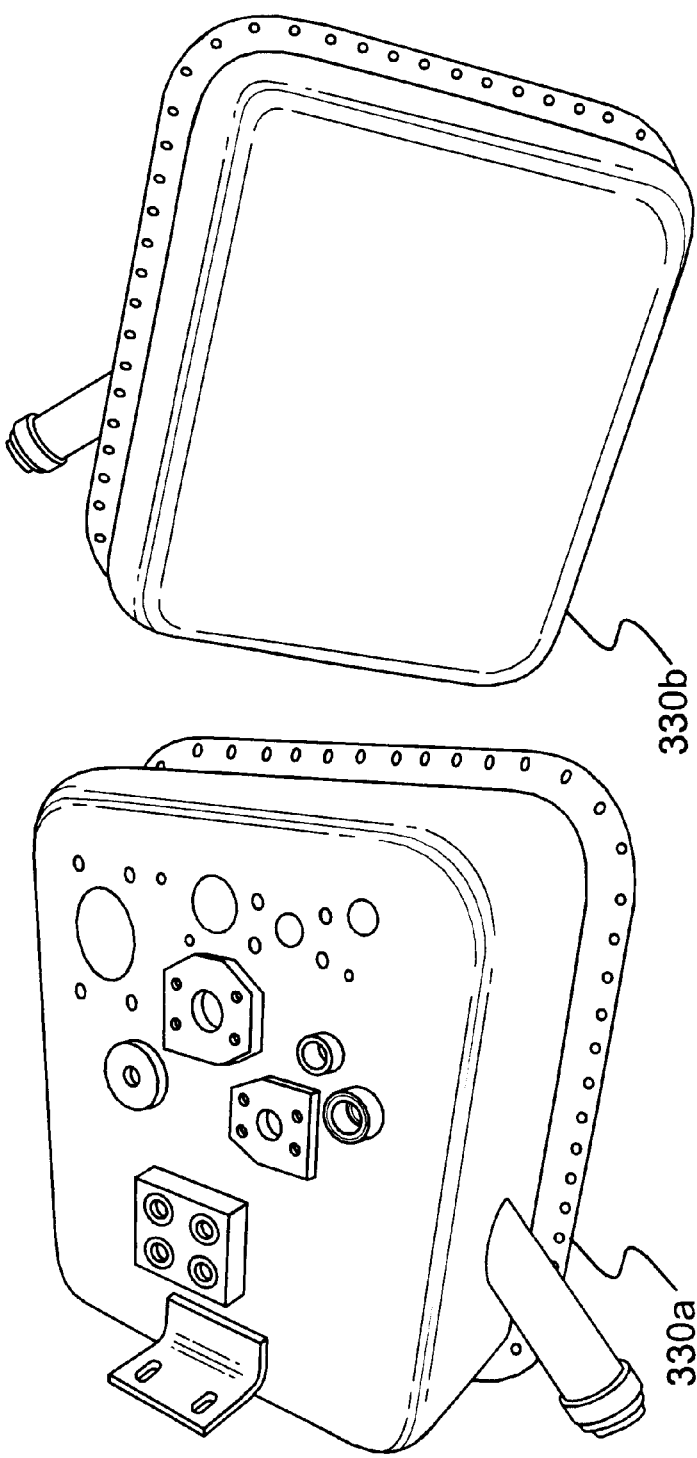
FIG. 4 is an example of an inputted object.

For purposes of illustration, FIG. 4 shows an example of an inputted object 330. In this case, the inputted object is an oil tank consisting of approximately 21 parts. As shown in FIG. 4, inputted object 330 includes a front surface 330a and a back surface 330b. In the process of inputting object 330 into memory 204, GP module 350 approximates the surface of object 330 with triangles. After the three-dimensional object has been inputted into memory, the cuts removal process (FIG. 1) begins.

Figure 5A:
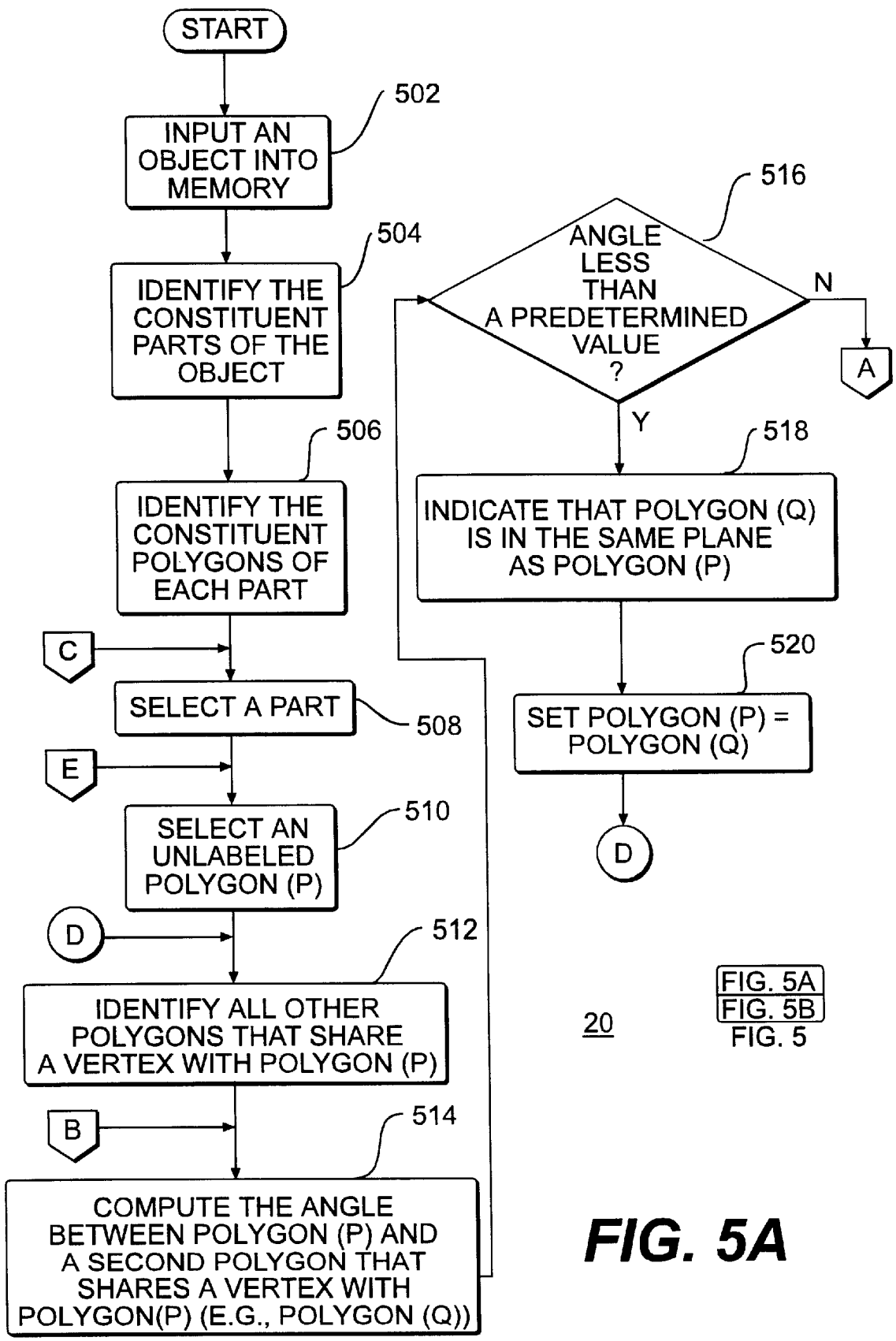
FIG. 5A a detailed flow diagram of the cuts removal algorithm in accordance with the present invention.
Figure 5B:
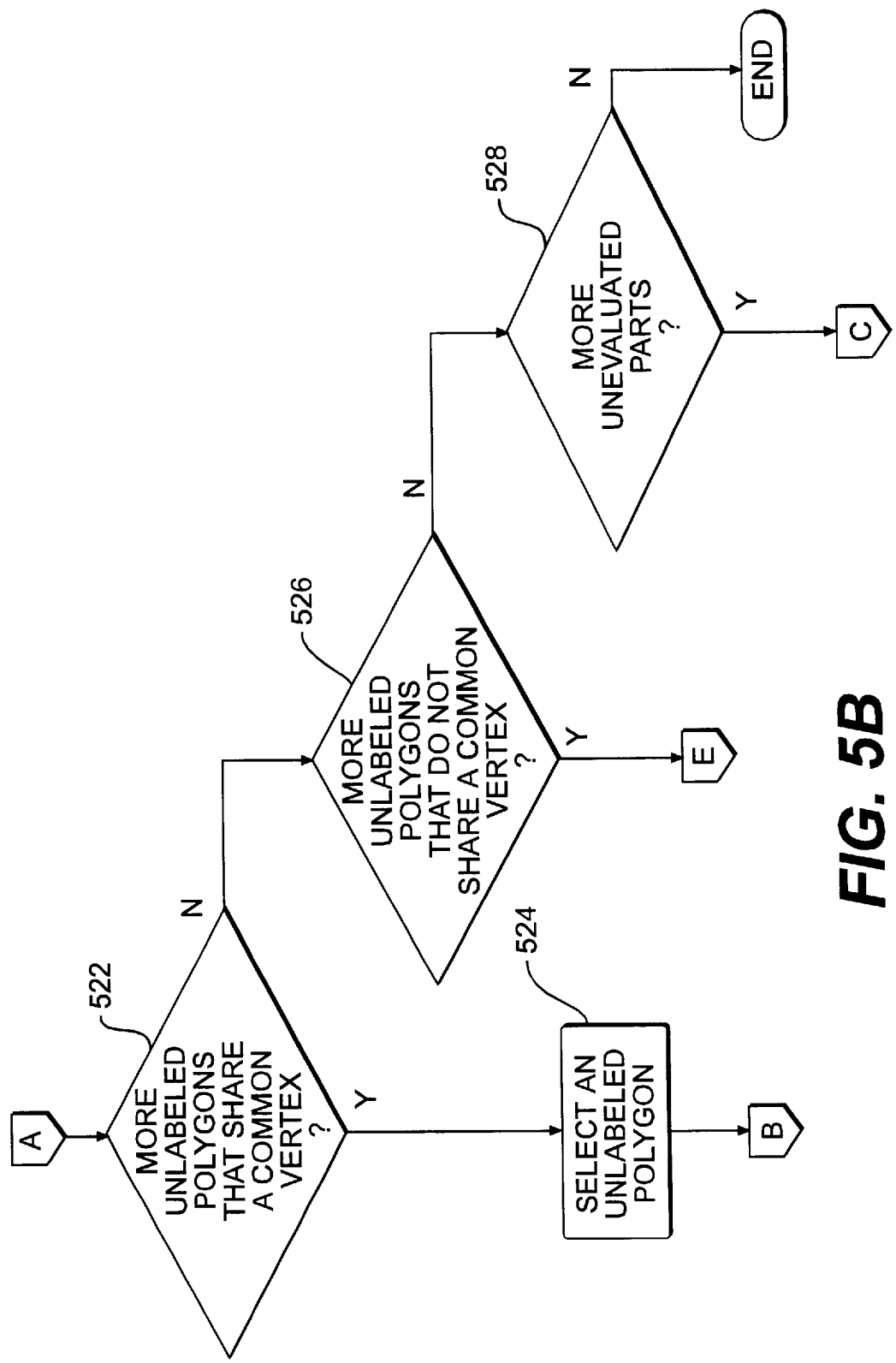
FIG. 5B is a detailed flow diagram of the cuts removal algorithm in accordance with the present invention.

Referring now to FIG. 5, there is shown a detailed flow diagram of the cuts removal algorithm depicted in FIG. 1. As shown in FIG. 5, the cuts removal algorithm begins when the object is inputted into memory (step 502). Processing next flows to step 504, where the process seeks to identify all of the constituent parts of the object. In an exemplary operation for the object shown in FIG. 4, GP module 350 creates approximately 18,596 triangles and over 250 cuts (features that belong to the parts, rather than to the assembly) as it creates a model of the oil tank. Once the triangles and cuts are identified, GP module 350 then identifies the geometry and polygons belonging to each assembly part (step 506). This is done by traversing the scene graph and collecting all the components needed to generate a given part including coordinates, faces, normals, materials, texture, cumulative transformation matrix, etc. Also, if needed, the coordinates may be pre-multiplied through the use of a transformation matrix in order to have the right scale and location. Processing then flows to step 508 where a first part is selected. Next in step 510, an arbitrary polygon P from the list of all polygons associated with the part is chosen and all its m vertices $p_i$, i=1, ..., m, are identified. Next, a set of all polygons $\{Q_j\}$, $P \notin \{Q_j\}$, that contain at least one of the vertices $p_i$ is identified (step 512). Processing then flows to step 514 where the angle between polygon P and one of the polygons $Q_j$ is computed as described above. The purpose is to identify two polygons that are substantially co-planar. In one embodiment, two polygons are considered to be substantially co-planar if the angle between the planes containing these polygons is approximately 0 degrees. In a second embodiment, two polygons are considered to be substantially co-planar if the angle between the planes containing these polygons is equal to 0 degrees. The concept may be better understood in the context of an example.

Figure 6:
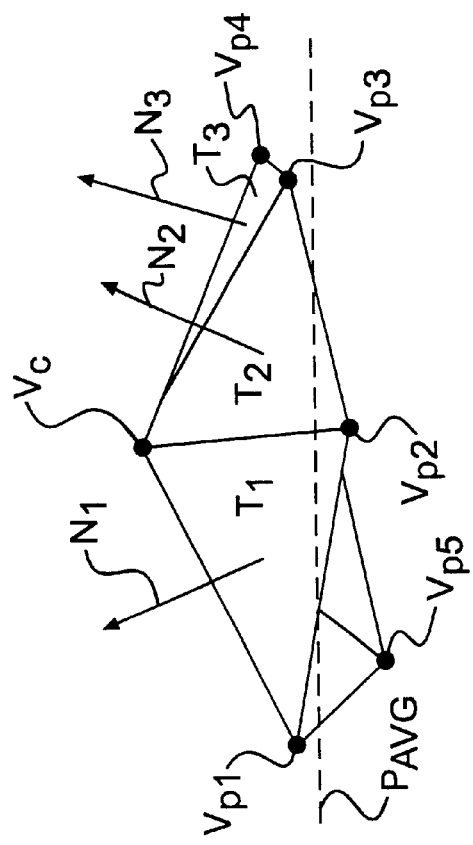
FIG. 6 is a diagram of a top view of a portion of an inputted object.

Referring to FIG. 6, a top view of a portion of object 330 is shown. In one embodiment, the angle between two planes is determined by calculating the normals of the planes since the angle between two planes equals the angle between their normals. As shown in FIG. 6, plane normal $\vec{n}$ is a vector perpendicular to the plane. If the equation of the plane $Ax+By+Cz+D=0$ is known, then: $\vec{n}=(A, B, C)$. Referring to FIG. 6, it is shown that three polygons comprising part of object 330 are labeled: $T_1$, $T_2$, and $T_3$. The three polygons shown in FIG. 6 share a common vertex $V_C$. The vertices for the three polygons are: $T_1=V_C$, $V_{P1}$ and $V_{P2}$; $T_2=V_C$, $V_{P2}$ and $V_{P3}$; $T_3=V_C$, $V_{P3}$ and $V_{P4}$. The normals for each polygon are labeled as $N_1$, $N_2$, and $N_3$, respectively. The equation of the plane to which a given polygon belongs can be computed from the coordinates of 3 polygon vertices $(x_1, y_1, z_1)$, $(x_2, y_2, z_2)$ and $(x_3, y_3, z_3)$ that do not lay on the same line using the following equation:

$$\begin{vmatrix} x-x_1 & y-y_1 & z-z_1 \\ x_2-x_1 & y_2-y_1 & z_2-z_1 \\ x_3-x_1 & y_3-y_1 & z_3-z_1 \end{vmatrix} = 0$$

from which follows that $A=(y_2-y_1)(z_3-z_1)-(z_2-z_1)(y_3-y_1)$, $B=(z_2-z_1)(x_3-x_1)-(x_2-x_1)(z_3-z_1)$, $C=(x_2-x_1)(y_3-y_1)-(y_2-y_1)(x_3-x_1)$.

Once the normals $\vec{n}_1$ and $\vec{n}_2$ for two planes are known, the angle $\Phi$ between them is computed as $\Phi=\arccos((\vec{n}_1 \cdot \vec{n}_2)/(|\vec{n}_1||\vec{n}_2|))$. If the angle between a polygon $Q_j$ and the polygon P is smaller than a pre-set tolerance level, e.g., 1 degree (step 516), the corresponding polygon $Q_j$ is labeled as substantially co-planar to polygon P (step 518) and the labeling procedure continues starting from the polygon $Q_j$ (step 520). In this way, a connected set of substantially co-planar polygons is identified. If the angle between polygon $Q_j$ and the polygon P is not smaller than a pre-set tolerance level, processing flows to step 522 (FIG. 5B) where the system determines whether another polygon $Q_j$ exists. If another polygon $Q_j$ exists, processing flows to step 524, and the system selects another polygon that shares a common vertex with polygon P. Processing then flows to step 514. If another polygon $Q_j$ does not exist, processing flows to step 526, where the system determines whether more unlabeled polygons that do not share a common vertex with polygon P exist. When no more polygons that are substantially co-planar to polygon P are found, the next not yet labeled polygon from the list of the remaining polygons is labeled as belonging to a different plane (step 510) and the plane labeling procedure repeats starting from this polygon. When there are no more polygons belonging to the current part, processing flows to step 528 and the system determines whether there are any more unevaluated parts of object 330. If there are more unevaluated parts, processing flows to step 508. If there are no more unevaluated parts, processing terminates. The outcome of the plane labeling procedure includes a relations list of each identified plane and the polygons that belong to them. To increase computational efficiency, vertex coordinates can be stored in an array together with a list of the references to the faces that use them. The faces can be stored in another array together with their pre-computed normals and references to the vertices they use. In this way, a very quick look-up is possible to identify vertices of a given face and the faces that use a given vertex, thus significantly accelerating the planes labeling procedure.

Figure 8:
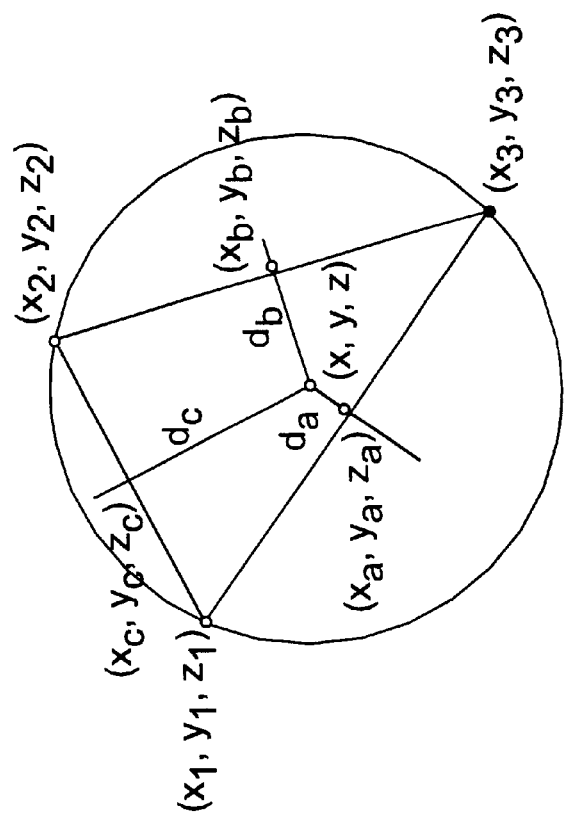
FIG. 8 is a diagram illustrating the method for calculating the center of a circle using three points that lie on the circle.
Figure 7:
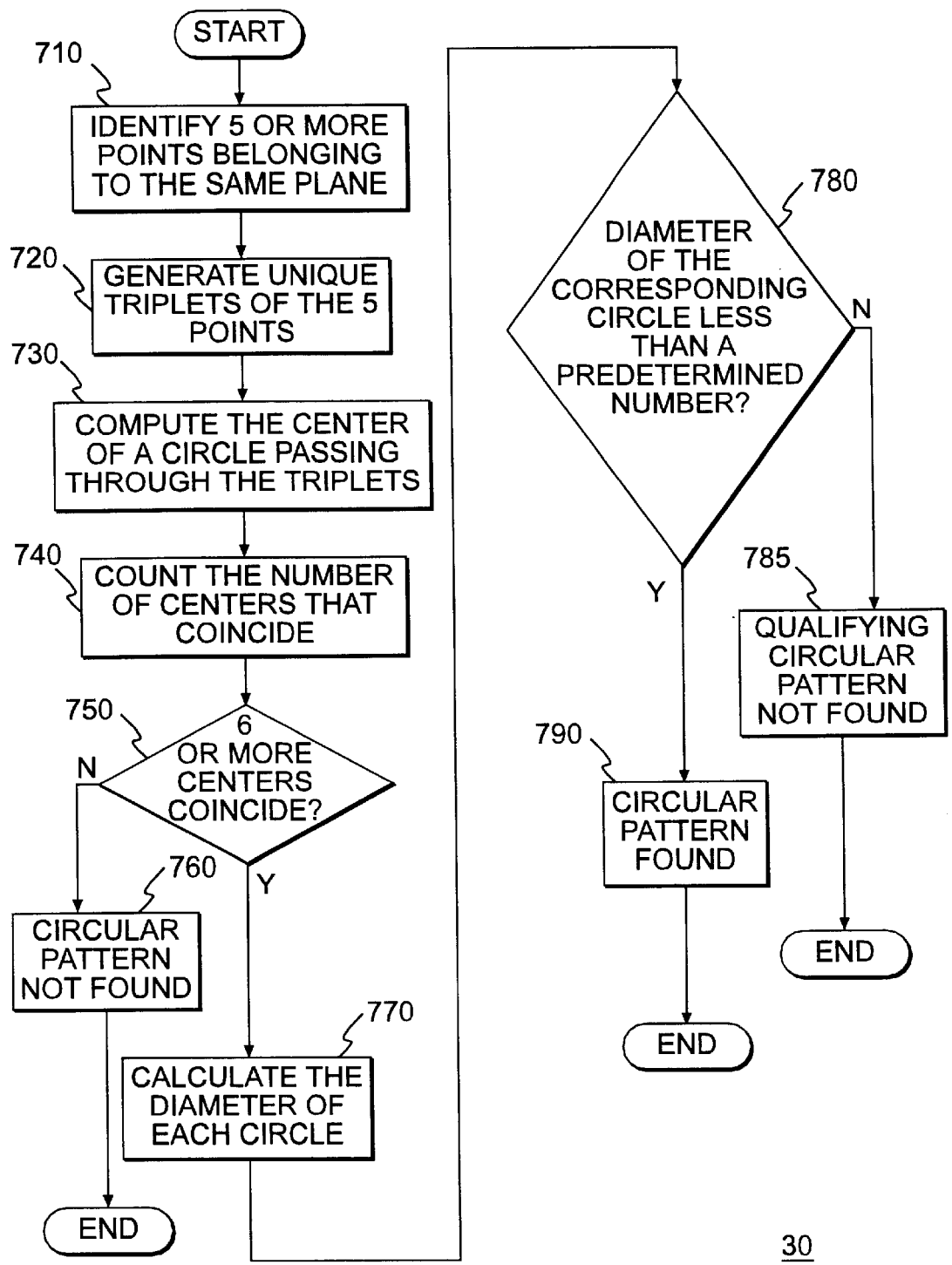
FIG. 7 is a detailed flow diagram of the circular pattern recognition algorithm in accordance with the present invention.

FIG. 7 is a flow diagram illustrating the steps performed by the circular pattern recognition algorithm as depicted in step 30 (FIG. 1), in which the system collects at least one of the vertices from the polygons that are substantially co-planar and verifies if any of them form circular patterns in a diameter smaller than a given value d. In another embodiment, the system collects all of the vertices from the polygons that are substantially co-planar and verifies if any of them form circular patterns in a diameter smaller than a given max value d. As shown in FIG. 7, this process begins when the system identifies at least a threshold number of points, e.g., 5, that are substantially co-planar (step 710). In another embodiment, a threshold number of points that are substantially co-planar are considered to be a circular pattern of the size less than or equal to d if all the points lay on the same circle with a diameter less than or equal to d. While this description assumes at least 5 vertices, those skilled in the art will recognize that it is also possible that a smaller number of vertices may be used to form the circular pattern. After 5 or more points have been identified, processing flows to step 720 where triplets of the 5 points are generated. In one embodiment, the triplets are unique. The system in step 730 then computes the center of a circle passing through each set of triplets. The center of a circle passing through 3 points $(x_1, y_1, z_1)$, $(x_2, y_2, z_2)$, and $(x_3, y_3, z_3)$ is computed based on the property that the center of the circle passing through the vertices of a triangle is also the point of the intersection of the lines perpendicular to the triangle sides and passing through their middle as shown in FIG. 8. The sides of the triangles may be defined as follows:

$\vec{a}=(x_3-x_1, y_3-y_1, z_3-z_1)$ $\vec{b}=(x_3-x_2, y_3-y_2, z_3-z_2)$ $\vec{c}=(x_2-x_1, y_2-y_1, z_2-z_1)$ Next, the midpoint for each line may be computed:

$(x_a, y_a, z_a) = \left(\frac{x_3+x_1}{2}, \frac{y_3+y_1}{2}, \frac{z_3+z_1}{2}\right)$ $(x_b, y_b, z_b) = \left(\frac{x_3+x_2}{2}, \frac{y_3+y_2}{2}, \frac{z_3+z_2}{2}\right)$ $(x_c, y_c, z_c) = \left(\frac{x_2+x_1}{2}, \frac{y_2+y_1}{2}, \frac{z_2+z_1}{2}\right)$ The coordinate for the center of each line may be computed as follows:

$\vec{d}_a=(x-x_a, y-y_a, z-z_a)$ $\vec{d}_b=(x-x_b, y-y_b, z-z_b)$ $\vec{d}_c=(x-x_c, y-y_c, z-z_c)$ This gives the following simultaneous equations which leads to the coordinates of the center of the circle passing through the given 3 points:

$$\begin{cases} \vec{a} \cdot \vec{d}_a = 0 \\ \vec{b} \cdot \vec{d}_b = 0 \\ \vec{c} \cdot \vec{d}_c = 0 \end{cases} \Rightarrow \begin{cases} (x_3-x_1)x+(y_3-y_1)y+(z_3-z_1)z = (x_3-x_1)x_a+(y_3-y_1)y_a+(z_3-z_1)z_a \\ (x_3-x_2)x+(y_3-y_2)y+(z_3-z_2)z = (x_3-x_2)x_b+(y_3-y_2)y_b+(z_3-z_2)z_b \\ (x_2-x_1)x+(y_2-y_1)y+(z_2-z_1)z = (x_2-x_1)x_c+(y_2-y_1)y_c+(z_2-z_1)z_c \end{cases}$$

If the points belong to a plane parallel to one of the coordinate planes, for example, if it is parallel to XY plane, the following simultaneous equations will yield x and y of the center (z equals to z of the plane):

$$\begin{cases} (x_3-x_1)x+(y_3-y_1)y+(x_3-x_1)x_a+(y_3-y_1)y_a \\ (x_3-x_2)x+(y_3-y_2)y=(x_3-x_2)x_b+(y_3-y_2)y_b \end{cases}.$$

Similarly, if the points belong to a plane parallel to the XZ plane, the following simultaneous equations will yield x and z of the center (y equals to y of the plane):

$$\begin{cases} (x_3-x_1)x+(z_3-z_1)z=(x_3-x_1)x_a+(z_3-z_1)z_a \\ (x_2-x_1)x+(z_2-z_1)z=(x_2-x_1)x_c+(z_2-z_1)z_c \end{cases}$$

A plane parallel to the YZ plane yields the following simultaneous equations:

$$(y_3-y_2)y+(z_3-z_2)z=(y_3-y_2)y_b+(z_3-z_2)z_b$$

$$(y_2-y_1)y+(z_2-z_1)z=(y_2-y_1)y_c+(z_2-z_1)z_c$$

Once the centers of each of the set of triplets have been computed, processing flows to step 740 where the system counts the number of centers that coincide. In every instance where a threshold number of centers (e.g., 6 or more) coincide (step 750), processing flows to step 770 where the diameter of each circle is calculated. If the diameter of the corresponding circle is less than a threshold number (step 780), it is determined that a circular pattern is found (step 790). The threshold number may be dynamically determined, or it may be predetermined. If the diameter of the corresponding circle is greater than a predetermined number, processing flows to step 785 where it is determined that a qualifying circular pattern has not been found. If the threshold number of centers (e.g., 6 or more) do not coincide (step 750), processing flows to step 760, and it is determined that a circular pattern is not found. When a circular pattern is found, all the vertices in the plane that form it and the computed center are stored for further processing. Once multiple circular patterns are found, they are sorted according to the diameter of the circles they form. This procedure is repeated for all identified planes so that circular patterns are found independently in each plane.

Figure 9:
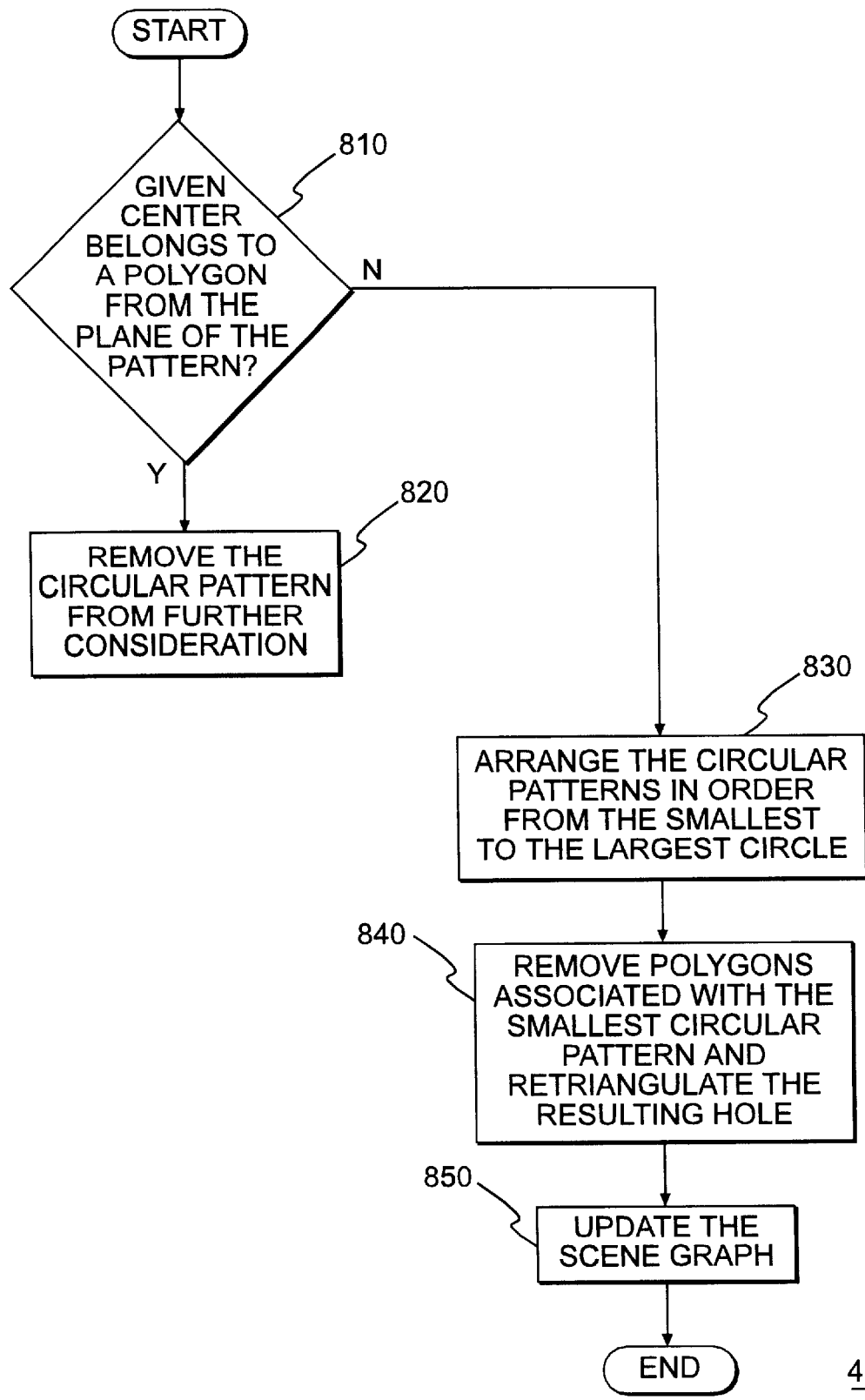
FIG. 9 is a detailed flow diagram of the removal algorithm in accordance with the present invention.
Figure 10:
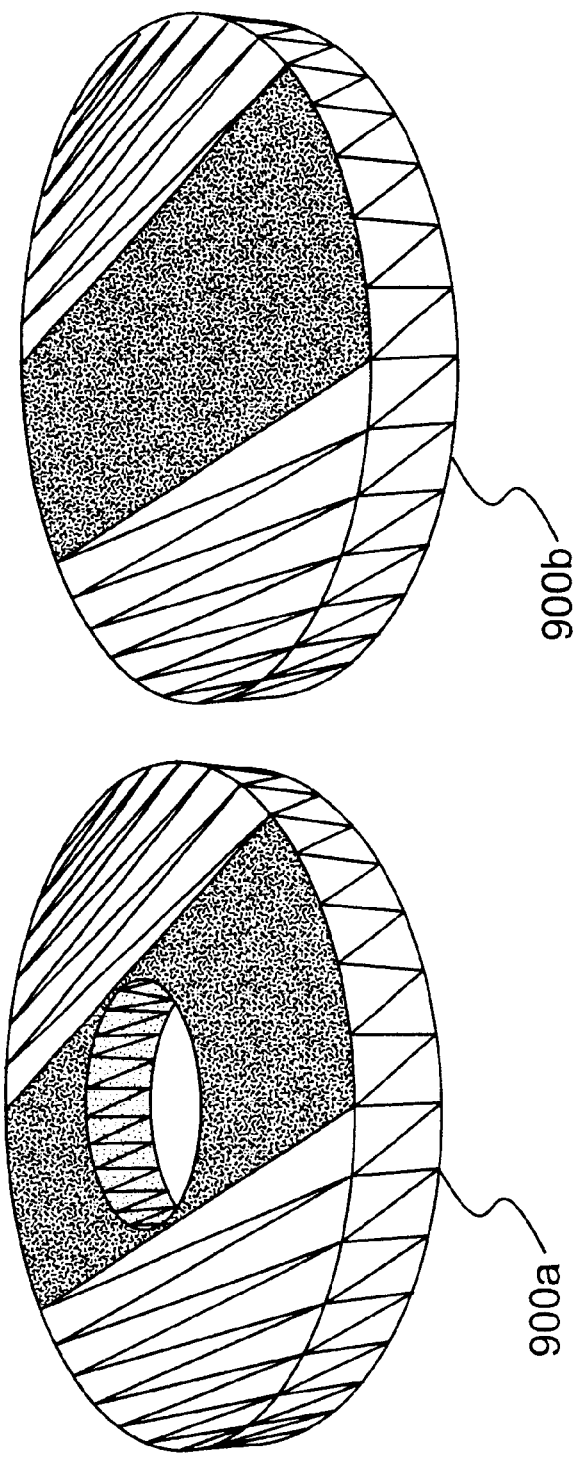
FIG. 10 is an example of a disc with a round cut in it before and after the cut has been removed.
Figure 11:
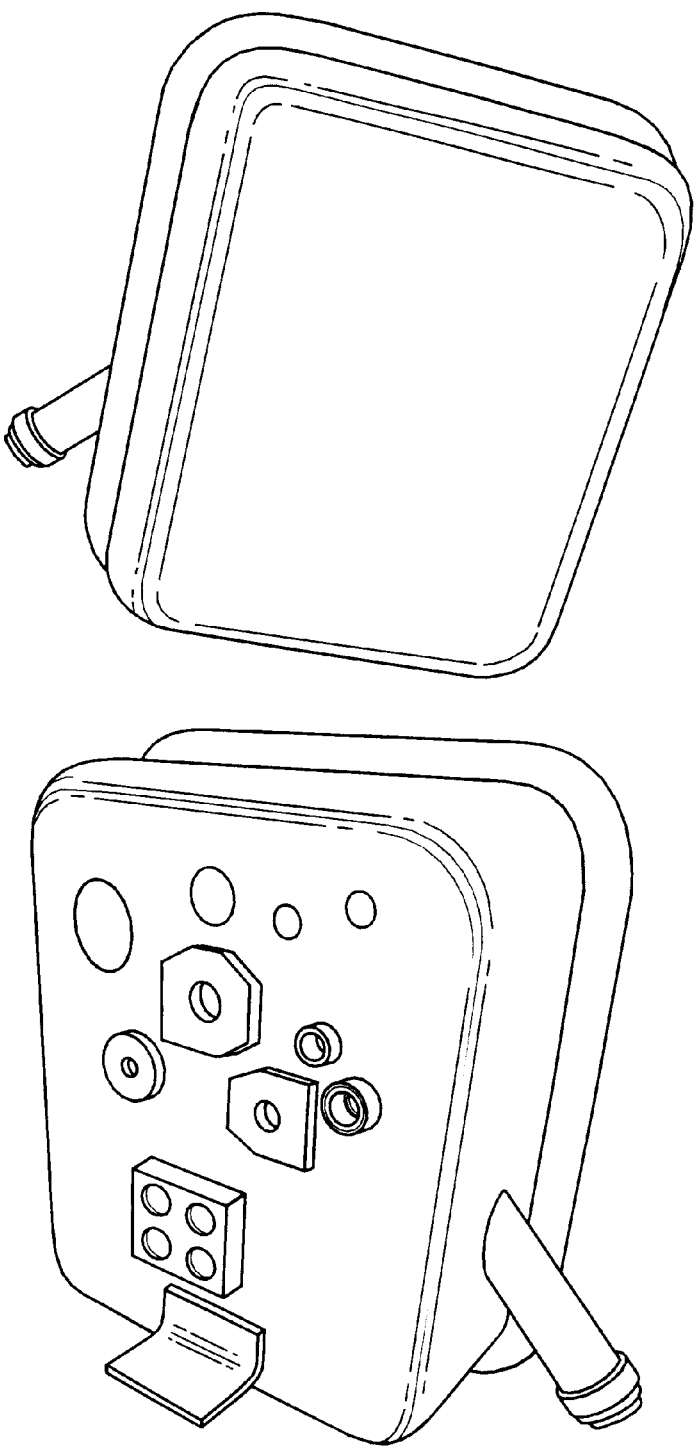
FIG. 11 is an example of the inputted object of FIG. 4 after the present invention has removed the round cuts.

FIG. 9 is a detailed flow diagram of the steps performed by the removal algorithm as depicted in step 40 (FIG. 1) as it removes the circular patterns identified in step 30 (FIG. 1) from the triangulated CAD model. The first step is to verify that a given center does not belong to any polygon from the plane of the pattern (step 810). This test allows the system to eliminate the circular patterns formed by cylindrical features from consideration (step 820), thus keeping only the patterns formed by the cuts. Next, in step 830, the removal algorithm arranges the circular patterns in order from the smallest to the largest circle. This allows the removal algorithm to gradually increase the magnitude of the circles removed from a CAD model and therefore gradually increase the impact of their removal on the model. The next step is to identify the plane to which the to-be-removed polygon belongs (step 840). Two groups of such polygons are distinguished: those that belong to the same plane as the circular pattern and those that do not. FIG. 10 shows an example of a disc with a round cut in it before (900*a*) and after (900*b*) the cut has been removed. In 900*a*, the polygons that are associated with the cut's circular pattern and do not belong to the same plane as the circular pattern are marked in grey, the polygons from the same plane are marked in black. Grey polygons connect two circular patterns from both sides of the disc, therefore they need to be removed. Black polygons need to be removed, and the resulting hole in the disc's mesh needs to be re-triangulated. One exemplary method of the present invention starts with the smallest diameter circle and works up to the largest diameter circle that satisfies the predetermined criteria, selects one vertex from the circular pattern, replaces all circular pattern vertices in all associated (black) faces with the selected vertex, and then removes all the degenerated polygons (those polygons whose sides merged). Pattern 900*b* shows the resulting surface for the example given in pattern 900*a*. The same procedure may be repeated for all identified circular patterns. Referring now to FIG. 11, there is shown a diagram of the inputted object as shown in FIG. 4, with the round cuts removed. As a polygon is removed, all the related data structures in the scene graph need to be updated in order to maintain the integrity and validity of the model (step 850). This includes vertex list, normals, texture and material index, etc.

From the foregoing description, it will be appreciated that the present invention provides an efficient system and method of reducing the complexity of triangulated CAD models while preserving the topological properties and shape of the original model. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow charts in FIGS. 1, 5, 7 and 9. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and, therefore, no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

Industrial Applicability

The system and method of cuts removal according to the present invention finds use in the efficient display of complex three-dimensional images in, for example, the manufacturing industry. The system has wide application in a variety of other computer graphic systems including automated manufacturing lines, where images of components are analyzed to evaluate compliance with design requirements and quality assurance.

Thus, the present invention provides a method of reducing the complexity of a triangulated CAD model. The system accomplishes cuts removal in a relatively uncomplicated manner and without the need for additional expensive components. When the present invention is used to reduce the complexity of a triangulated CAD model, the computations used to render a CAD model are significantly reduced, thereby reducing the response time needed to display CAD models.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method of reducing the complexity of a triangulated CAD model comprising the steps of:
    identifying a plurality of co-planar vertices in said model;
    removing said plurality of vertices from said model, provided said plurality of vertices form a circle of a predetermined size; and
    triangulating an opening left by removing said plurality of vertices from said model.

2. The method of claim 1, wherein said identifying includes determining that said plurality of vertices are co-planar, provided an angle formed between a first polygon including a first vertex and a second polygon including a second vertex is less than a predetermined value.

3. The method of claim 1, wherein said removing includes:
    identifying a plurality of co-planar vertices comprising X, Y and Z coordinates;
    generating a plurality of unique triplets using the coordinates of said plurality of vertices;
    determining a center of a circle passing through each of said plurality of triplets;
    identifying a plurality of coinciding centers; and
    computing a diameter for each of said plurality of coinciding centers.

4. The method of claim 3, further including:
    organizing the diameters with their associated centers in increasing order of size; and
    removing said centers from said model in increasing order of size, provided said plurality of vertices form a circle of a predetermined size.

5. The method of claim 1, wherein said triangulating includes:
    verifying said circle is not associated with a polygon from a plane of said model;
    identifying a first plurality of polygons associated with said circle and located on a different plane;
    identifying a second plurality of polygons associated with said circle and located on the same plane as said circle;
    removing said first and second plurality of polygons; and
    re-triangulating a void created by the removal of said second plurality of polygons.

6. A machine-readable storage medium having stored thereon machine executable instructions, the execution of said instructions adapted to implement a method for reducing the complexity of a triangulated CAD model, said method comprising:
    identifying a plurality of co-planar vertices in said model;
    removing said plurality of vertices from said model, provided said plurality of vertices form a circle of a predetermined size; and
    triangulating an opening left by removing said plurality of vertices from said model.

7. The machine-readable storage medium of claim 6, wherein said identifying includes determining that said plurality of vertices are co-planar, provided an angle formed between a first polygon including a first vertex and a second polygon including a second vertex is less than a predetermined value.

8. The machine-readable storage medium of claim 6, wherein said removing includes:
    identifying a plurality of co-planar vertices comprising X, Y and Z coordinates;
    generating a plurality of unique triplets using the coordinates of said plurality of vertices;
    determining a center of a circle passing through each of said plurality of triplets;
    identifying a plurality of coinciding centers; and computing a diameter for each of said plurality of coinciding centers.

9. The machine-readable storage medium of claim 8, further including:
    organizing the diameters with their associated centers in increasing order of size; and
    removing said centers from said model in increasing order of size, provided said plurality of vertices form a circle of a predetermined size.

10. The machine-readable storage medium of claim 6, wherein said triangulating includes:
    verifying said circle is not associated with a polygon from a plane of said model;
    identifying a first plurality of polygons associated with said circle and located on a different plane;
    identifying a second plurality of polygons associated with said circle and located on the same plane as said circle;
    removing said first and second plurality of polygons; and
    re-triangulating a void created by the removal of said second plurality of polygons.

11. An apparatus for reducing the complexity of a triangulated CAD model comprising:
    a network device having a memory containing a program that includes:
        a module for identifying a plurality of co-planar vertices in said model;
        a module for removing said plurality of vertices from said model, provided said plurality of vertices form a circle of a predetermined size; and
        a module for triangulating an opening left by removing said plurality of vertices from said model.

12. The apparatus of claim 11, wherein said module for identifying includes the capability to determine that said plurality of vertices are co-planar, provided an angle formed between a first polygon including a first vertex and a second polygon including a second vertex is less than a predetermined value.

13. The apparatus of claim 11, wherein said module for removing includes the capability to:
    identify a plurality of co-planar vertices comprising X, Y and Z coordinates;
    generate a plurality of unique triplets using the coordinates of said plurality of vertices;

determine a center of a circle passing through each of said plurality of triplets;

identify a plurality of coinciding centers; and compute a diameter for each of said plurality of coinciding centers.

14. The apparatus of claim 13, further including:

a module for organizing the diameters with their associated centers in increasing order of size; and a module for removing said centers from said model in increasing order of size, provided said plurality of vertices form a circle of a predetermined size.

15. The apparatus of claim 11, wherein said module for triangulating includes the capability to:

verify said circle is not associated with a polygon from a plane of said model;

identify a first plurality of polygons associated with said circle and located on a different plane;

identify a second plurality of polygons associated with said circle and located on the same plane as said circle;

remove said first and second plurality of polygons; and re-triangulate a void created by the removal of said second plurality of polygons.

16. A method of reducing the complexity of a triangulated CAD model comprising the steps of:

identifying a plurality of co-planar vertices in said model;

establishing a threshold circle size;

comparing said plurality of vertices in said model with said threshold size;

removing said plurality of vertices from said model in response to said comparison; and triangulating an opening left by removing said plurality of vertices from said model.

17. The method of claim 16, wherein said removing includes the step of removing said plurality of vertices from said model in response to said comparison, provided said plurality of vertices from said model form a circle smaller than said threshold size.

* * * * *